United States Patent

[11] 3,579,036

| | | |
|---|---|---|
| [72] | Inventor | Marion B. McCoy<br>Centerville, Ohio |
| [21] | Appl. No. | 793,677 |
| [22] | Filed | Jan. 24, 1969 |
| [45] | Patented | May 18, 1971 |
| [73] | Assignee | The National Cash Register Company<br>Dayton, Ohio |

[54] CROWBAR CIRCUIT FOR VOLTAGE CUTOFF WITH SERIES AND SHUNT SWITCHABLE MEANS
14 Claims, 2 Drawing Figs.

[52] U.S. Cl. .................................. 317/16, 317/33
[51] Int. Cl. ................................. H02h 3/00, H02h 7/00, H02h 5/00
[50] Field of Search ........................ 317/16, 33, 36, 38, 50, 22, 61.5; 371/61.5; 323/1, 8, 9, 22

[56] References Cited
UNITED STATES PATENTS

| | | | |
|---|---|---|---|
| 3,359,434 | 12/1967 | Galluzzi | 323/22 |
| 3,371,262 | 2/1968 | Bird | 317/33 |
| 3,475,653 | 10/1969 | Odenberg | 317/33 |
| 3,125,715 | 3/1964 | Brooks | 317/33X |
| 3,350,607 | 10/1967 | Jones | 317/33 |
| 3,353,066 | 11/1967 | DeSouza | 317/31 |

Primary Examiner—D. F. Duggan
Assistant Examiner—U. Weldon
Attorneys—Louis A. Kline and Albert L. Sessler, Jr.

ABSTRACT: A crowbar circuit comprises means sensitive to an overcurrent condition through a load to promptly throw a crowbar across the load, thereby isolating the load from its power supply. To prevent an unreasonable dissipation of power through the crowbar, the same sensing mechanism which throws the crowbar initiates operation of a time delayed mechanism which disconnects the power supply from the crowbar. To further conserve the power supply during the interval following operation of the crowbar and before disconnection of the power supply, the circuit includes energy absorbing means which retards dissipation of power from the power supply.

Patented May 18, 1971
3,579,036
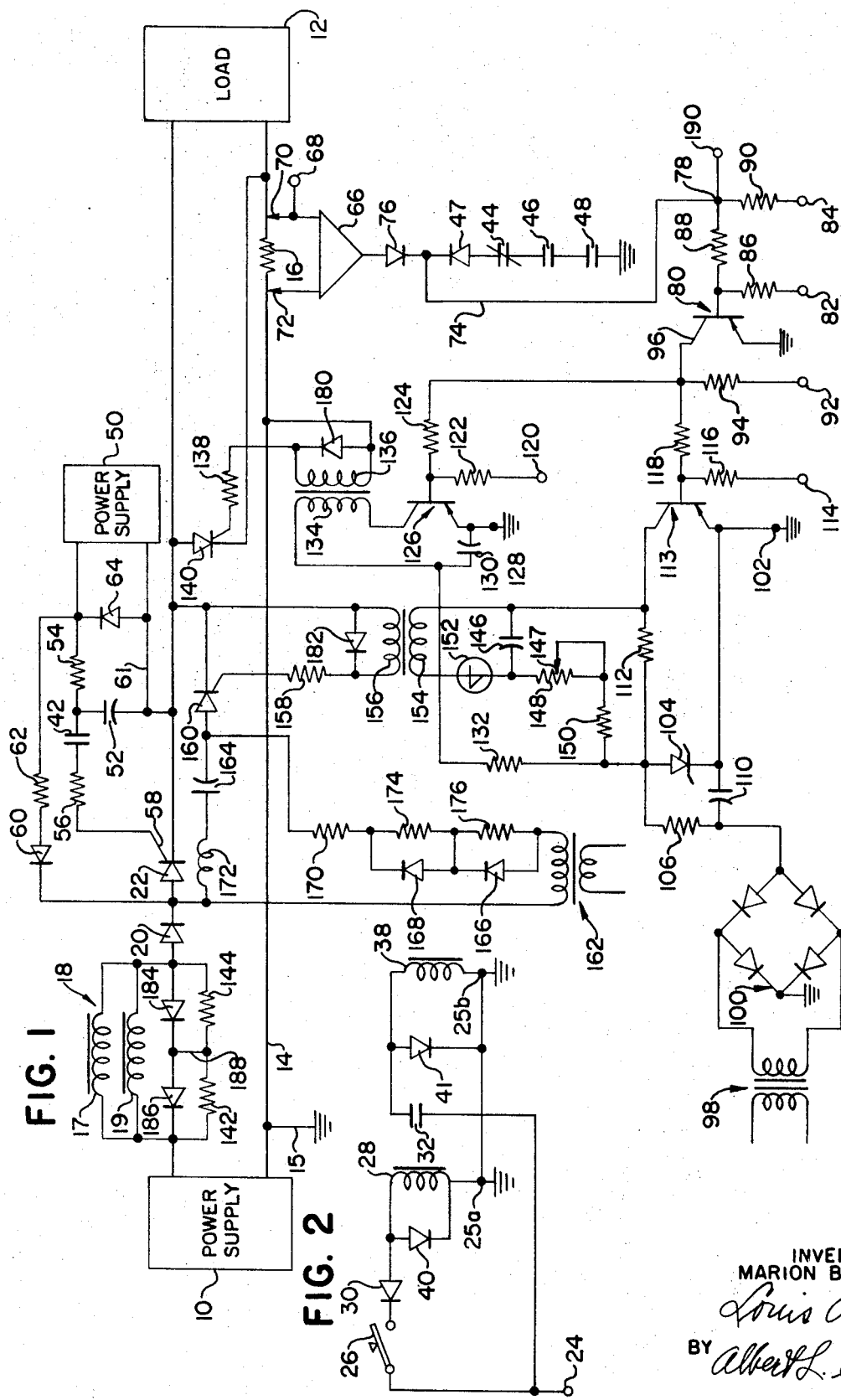
INVENTOR
MARION B. MC COY
BY Louis A Kline
Albert L. Sealy Jr.
HIS ATTORNEYS

CROWBAR CIRCUIT FOR VOLTAGE CUTOFF WITH SERIES AND SHUNT SWITCHABLE MEANS

This invention relates to a crowbar circuit having a first means responsive to an overcurrent load condition to throw a crowbar across the load, and second means also responsive to the overcurrent condition to disconnect the power supply from the crowbar so as to minimize power dissipation through the crowbar. The crowbar circuit is further characterized by a fast acting reset capability so that the time delay following voltage cutoff to protect a given load until the same power supply with protective crowbar circuit may be used on the same or another load is nominal.

A crowbar is a well established circuit mechanism for protecting a load against a destructive operating condition. With the development of solid state rectifier devices, especially controlled rectifiers, it has become a common practice to employ a means to sense a potentially destructive operating condition to initiate a signal which gates a controlled rectifier. The controlled rectifier is located so as to close a shunt circuit which relieves the load of the potentially destructive operating condition. Ordinarily, the shunt circuit closed by the controlled rectifier also shunts the power supply to the load. To avoid placing a complete and sometimes destructive short across the power supply, it has been a well established practice to include a resistance in series with the controlled rectifier or other crowbar mechanism so as to protect the power supply from a dead short.

An unfortunate consequence of a series resistance in the crowbar circuit is that the power supply continues to deliver power to the series resistance and, as a consequence, the voltage drop across the series resistance appears across the load. In many cases this consequence can be tolerated since the crowbar is nevertheless effective to substantially reduce the voltage applied to the load and thus protect the load. In other cases, even a minor component of the voltage available from the power supply will be destructive to the load. In still other cases, particularly where the power supply comprises one or more capacitors discharging through the load, a crowbar producing a low resistance shunt across the load, will so accelerate the discharge of the power supply that the voltage appearing at the load due to the passage of current through the shunt circuit will only aggravate the destructive condition sought to be corrected. At the same time, of course, a power supply produced by a capacitor discharge is severely depleted by the low resistance shunt and becomes inoperable as a power supply until its capacitors have been recharged.

An object of the present invention is to provide an improved crowbar circuit.

Another object of the present invention is to provide a disconnect circuit in combination with a crowbar circuit to protect the power supply when the crowbar is "thrown" to protect a load.

Still another object of the present invention is to provide a circuit effective first to "throw" a crowbar across a load and then effective to disconnect the power supply from the crowbar, there being a time delay in the disconnect circuitry which assures that the crowbar operates first.

A further object of the present invention is to provide a crowbar circuit having substantially no series resistance in the crowbar whereby the crowbar operates to produce an essentially complete short across the load to be protected.

Still a further object of the present invention is to provide a crowbar circuit which produces a substantially complete short across a load to be protected and also includes means to protect the power supply to the load from an unreasonable dissipation of power through the crowbar.

Yet a further object of the present invention is to provide a crowbar circuit including time delay means to disconnect the power supply for the load being protected from the crowbar, and energy absorbing means to protect the power supply in the interval of time after the crowbar is "thrown" and before the power supply has been disconnected from the crowbar.

A still further object of the present invention is to provide a combination power supply and crowbar cutoff circuit which, upon "throwing" of the crowbar, resets itself for further operation upon the same or a different load within fractions of a second.

Other objects and advantages reside in the circuits employed, the combination thereof, the method of manufacture and the mode of operation, as will become more apparent from the following description.

In the drawing, FIG. 1 is a circuit diagram of a crowbar circuit embodying the present invention.

FIG. 2 is a circuit diagram illustrating a manual control for the crowbar circuit of FIG. 1.

The circuit diagram of FIG. 1 was arranged primarily for the testing of electrical elements such as transistors and more particularly for testing whether a transistor contains at least its rated resistance between appropriate terminals of the transistor. For this purpose a power supply producing a relatively high voltage, such as 500 volts DC, is desired. If the transistors to be tested are within their specifications, the current flow between the terminals being tested is nominal and accordingly the current drain from the power supply is nominal. For this purpose, therefore, it proves convenient to employ a power supply which comprises a bank of capacitors placed across the transistor terminals being tested. So long as the transistor is within its specifications, the capacitors are required to deliver only nominal current and accordingly the time delay between successive operations required for recharging of the capacitors is nominal.

The power supply is illustrated schematically at 10 in FIG. 1. While the power supply 10 is conveniently a group of capacitors, as described, any other power supply having the power capabilities for testing the load will suffice. The load which, as described, may be a transistor, is schematically illustrated at 12. A conductor 14 connects the negative terminal of the power supply 10 through a current sensor in the form of a shunt resistance 16 to one terminal of the load. For the purposes of this testing circuit, it is preferred that the conductor 14 provide a circuit ground, as illustrated at 15, and represent the negative side of the power supply. The positive terminal of the power supply 10 is connected to the opposite terminal of the load 12 through an energy absorbing or accumulating means 18, a diode 20 and a switchable device 22. The energy absorbing means 18 presents only a small resistance through the inductors 17 and 19. If the load being tested is within its specifications, current through these inductors will be nominal and the inductors 17 and 19 will therefore produce an insignificant voltage drop. The energy absorbing means 18 performs its most important function when the transistor fails to meet its rated specifications and will be discussed in greater detail in its functioning environment at a later point in this description.

The switchable device 22 is preferably a controlled rectifier such as a silicon controlled rectifier. As well understood in the art, such rectifier blocks the positive side of the power supply 10 from the load until gated to a conductive state. When the controlled rectifier 22 is switched to its conductive condition, essentially the entire voltage of the power supply 10 is placed across the load 12 and any current flow through the load 12 will manifest itself by producing a voltage drop across the shunt resistance or current sensor 16. If this voltage drop is low in comparison to a reference voltage, the test result will be satisfactory and the controlled rectifier 22 turned off by means to be described.

The controlled rectifier 22 is gated to a conductive condition with aid of a control circuit illustrated in FIG. 2. The reference number 24 depicts a terminal for any suitable source of negative voltage. Reference numerals 25a and 25b depict positive terminals, or circuit grounds. Flow of current from the negative terminal to ground is broken by a manually operable switch 26.

Upon closure of the manual switch 26 a path from the terminal 24 through a relay coil 28 and a diode 30 to ground is provided. Responsive to the relay coil 28 is a relay switch 42 illustrated in FIG. 1. Also responsive to relay coil 28 is relay switch 32, illustrated in FIG. 2. Switch 32 closes a path from terminal 24 through relay coil 38 to ground. The switch operated by relay coil 38 and other switches operated by relay coil 28 will be described in a later part of the specification. The important point to note for the present is that manual closure of the switch 26 results in immediate closure of relay switch 42 which is in the gate operator circuit for the controlled rectifier 22.

The operator circuit for the controlled rectifier 22 includes a power supply 50 which charges a capacitor 52 through resistor 54 during those times when the switch 42 is open. Upon closure of the switch 42, the capacitor 52 discharges to a gate 58 through a resistor 56, the discharge returning to the opposite side of the capacitor 52 through the cathode of the controlled rectifier 22.

This discharge provides a positive pulse sufficient to gate the controlled rectifier 22 to a conductive state. While current continues to flow to the gate 58 through the switch 42, the voltage drop across resistor 54 is large enough to prevent reformation of a gate pulse until the switch 42 has been opened.

Upon gating of the controlled rectifier 22 to a conductive state, the full voltage of the power supply 10 is applied across the load 12 in series with the resistance 16. Assuming the subject invention to be applied to transistor testing, as above-described, only a nominal current will flow if the transistor is within its design specifications. To assure that the controlled rectifier 22 will remain conductive throughout the test, the power supply 50 is employed to hold the controlled rectifier 22 conductive even though the transistor being tested may not conduct sufficient current to hold the controlled rectifier 22 in a conductive state. Accordingly, the positive terminal of the power supply 50 has a path through resistor 62 and forward diode 60 to the anode for the controlled rectifier 22 and through the conductor 61 to the negative side of the power supply 50. The current thus supplied through the controlled rectifier 22 is desirably a low level current just sufficient to maintain conductivity of the controlled rectifier 22 after the gating thereof and irrespective of the current flow permitted by the load. Diode 20 prevents a division of this current between the load 12 and the power supply 10.

As will be explained subsequently, the diode 64 across the power supply 10 protects that power supply against events that will occur should the test load be defective, i.e., outside its design specifications.

The circuitry of FIGS. 1 and 2, to the extent thus far described, constitutes a complete circuit for the testing of loads such as transistors. Thus, if transistors within their design specifications are connected to the circuit as test loads and the voltage detected across the current sensor 16 is below a value predetermined for each type of transistor tested, the operator need only throw the switch 26 to expose the load to a voltage and, finding no unusually high voltage across the current sensor 16, open the switch 26 to terminate the test in a manner to be later described. Should an unreasonably high voltage have appeared across the current sensor 16, however, this would be symptomatic of a breakdown in the transistor body between the terminals being tested. As well-known to those skilled in the art, such breakdown is frequently destructive of the transistor being tested, especially if the application of the voltage from the power supply 10 is prolonged. The faster the voltage can be withdrawn, the greater the likelihood the transistor will be saved for safe and effective operation at a voltage level lower than that supplied by the power supply 10. The purpose of the remaining circuit components to be described is to throw a crowbar, withdrawing the test voltage from the load 12 as quickly as possible (less than 10 microseconds), disconnect the power supply 10 from the crowbar to prevent unreasonable power dissipation (approximately 60 additional microseconds), and then reset the circuitry for a further test operation within approximately 500 milliseconds.

For detecting an overcurrent condition such as would be destructive to the transistor under test, a high gain amplifier 66 is connected to operate as a voltage comparator. As one example, the amplifier 66 may be a commercially available amplifier sold by Philbrick Researches, Inc. of Dedham, Mass., under Model Number SP656.

A reference voltage from any suitable DC voltage source is applied to a reference terminal 68. The reference terminal 68 is common to amplifier terminal 70 which is connected to one side of the current sensor or shunt resistance 16. Amplifier terminal 72 is connected to the other side of the shunt resistance 16. So long as the voltage drop across the shunt resistance 16 is lower than the reference voltage, the output of the amplifier to the diode 76 is a negative signal blocked by the diode 76. As soon as the voltage drop across the shunt resistance 16 exceeds the reference voltage applied to the terminal 68, the amplifier output comprises a positive signal passed by the diode 76 through the conductor 74 to a control point 78. The presence of a positive signal at control point 78 adjusts the bias on a transistor 80 so as to switch this transistor from an on state to an off state.

As appears in FIG. 1, the emitter of transistor 80 is at circuit ground. The base is normally biased negatively by resistors 86, 88 and 90 which form a voltage divider between a negative voltage applied to terminal 84 and a positive voltage applied at terminal 82.

Upon appearance of a sufficient positive signal at control point 78, however, the negative base bias is sufficiently offset that the bias shifts to a positive base bias, thereby switching transistor 80 from a normally conductive to a nonconductive state.

An immediate result of an overcurrent condition detected from the current sensor 16 is therefore the switching of transistor 80 from a conductive to a nonconductive state. This switching is employed to initiate gate signals to crowbar and disconnect circuits by circuit mechanisms to be described.

For convenience the amplifier 66 and its associated circuitry leading to and including the collector 96 of transistor 80 may hereafter be referred to as a detector means or circuit. The transistor 80 and its associated biasing circuitry, which are a part of the detector circuit, may hereafter be referred to separately as a signal inverter, or inverter circuit.

The crowbar comprises a switchable device 140 connected between the positive and negative sides of the power supply 10 and directly across the load 12. An important feature of the present invention is that when the switchable device 140 switches to its conductive state, an essentially complete short is placed across the load. At the same time a series circuit comprising the energy absorbing means 18, rectifier 22, the current sensor 16 and the crowbar is completed across the power supply 10 with the result that the only voltage to which the load 12 is exposed is the nominal voltage drop through the switchable device or crowbar 140 and its immediately adjacent leads. The switchable device 140 is conveniently a controlled rectifier such as a silicon controlled rectifier. The gate operator circuitry for the controlled rectifier 140 includes a transistor 126 having base bias supplied from a source of positive voltage connected to terminal 120. During those times when the transistor 80 is conductive, the positive voltage at 120 has a path to ground through resistor 122, resistor 124 and the collector for the transistor 80. The voltage drop across the resistor 124 accordingly maintains a positive bias on the base of transistor 126, holding that transistor in a nonconductive state. When an overcurrent signal is received from the detector circuit, however, the transistor 80 switches to a nonconductive state, allowing a negative voltage applied at terminal 92 to apply a negative base bias through resistor 124 to the base of transistor 126. Accordingly, when an overcurrent signal is received from the detector circuit, the transistor 126 becomes conductive.

Associated with the operator circuit for the controlled rectifier 140 is a negative voltage supply provided by a transformer 98 having its secondary connected across a bridge rectifier 100. The negative voltage output of the bridge rectifier 100 is stabilized by a ground connection at terminal 102 through resistor 106 and Zener diode 104, both in parallel with capacitor 110.

The negative voltage output of the bridge rectifier 100 is passed through resistors 106 and 132 to a capacitor 130 in the gate circuit for the controlled rectifier 140. During those times when the transistor 126 remains nonconductive, the negative voltage from the bridge rectifier 100 holds the capacitor 130 charged from the ground terminal 128. As soon as the transistor 126 becomes conductive, the capacitor 130 discharges through a transformer primary 134 and the collector-emitter circuit of transistor 126, thereby creating a voltage pulse across the transformer secondary 136. One end of the secondary is grounded to the conductor 14 so as to cause the secondary 136 to deliver a positive voltage pulse through resistor 138 to the gate of the controlled rectifier 140, thereby switching the controlled rectifier 140 to a conductive state.

The result is that within microseconds following detection of an overcurrent through the current sensor 16, the controlled rectifier 140 is gated to a conducting condition. Two consequences follow. The load 12 is short-circuited so that all voltage is removed therefrom. The power supply 10 is also connected in series with the parallel inductors 17 and 19, the current sensor 16, diode 20, controlled rectifier 22 and the crowbar at 140. Rapid dissipation of the power supply 10 is therefore imminent and the capacitors in the power supply 10 accordingly commence a discharge through the crowbar circuit. The initial effect is an accumulation of charge in the inductors 17 and 19 and this charge accumulation delays dissipation of power from the power supply 10 directly to ground.

At the same time this accumulation of energy in the inductors 17 and 19 occurs, the circuit is preparing itself to interrupt the path from the power supply 10 to the crowbar. The preparation commenced at essentially the same time that the crowbar was thrown, and specifically at the same time the transistor 80 was switched to a nonconductive state. When this switching occurred, a positive bias on the base of a transistor 113, held by current from a positive voltage applied at terminal 114 and passing through resistors 116 and 118 and the transistor 80 to ground, was switched to a negative bias by reason of the switching of transistor 80 and a negative voltage applied at the terminal 92. This negative voltage at the terminal 92 had been dropped to ground through resistor 94 by reason of the conductivity in the transistor 80.

Accordingly, when the transistor 80 switched from a conductive to a nonconductive state, the transistor 113 was rendered conductive. This opened a new path to ground at the terminal 102 for the negative voltage supplied through the bridge rectifier 100, this path comprising the resistor 112 and the transistor 113. In consequence, a voltage drop appeared across the resistor 112. This voltage across the resistor 112 is applied to a series circuit including resistors 148 and 150 and capacitor 146.

Prior to the switching of the transistor 80 to its nonconductive state, the voltage across the capacitor 146 was zero. However, when the transistor 80 switched nonconductive and accordingly the transistor 113 became conductive, one plate of the capacitor 146 was grounded through transistor 113 and the opposite plate became negatively charged by reason of its connection to the negative voltage supplied through the bridge rectifier 100. The growth rate of voltage across the capacitor 146 is regulated by the resistors 148 and 150.

Connected across the capacitor 146 is a negative resistance device 152 in series with a transformer primary 154. As one example, the device 152 may be a four-layer diode such as sold by International Telephone and Telegraph under Model Number 4E20-28.

As the capacitor 146 is initially exposed to the voltage drop across resistor 112, the device 152 is nonconductive. As a potential difference builds up across the capacitor 146, however, the device 152 is exposed to a voltage sufficient to produce a reverse breakdown therein, whereupon the capacitor 146 is given a low resistance discharge path through the transformer primary 154. The surge of current through the transformer primary 154 generates a positive pulse in the transformer secondary 156 which passes to the gate of a switchable device 160 through resistor 158. This switchable device is conveniently a silicon controlled rectifier which is gated to an on condition by the positive pulse from the secondary 156.

Prior to the time the controlled rectifier 160 is switched to a conductive state, this rectifier has been blocking the discharge of a capacitor 164. Also, prior to the switching of controlled rectifier 160, the capacitor 164 was being maintained in a fully charged condition by means of a power supply including a transformer 162. Transformer 162 includes a primary connected to any suitable alternating voltage source. The secondary of the transformer 162 charges the capacitor 164 through a path which includes a diode 166, diode 168, resistor 170 and inductor 172.

The resistors 174 and 176 across the diodes 166 and 168 are of a very high resistance value, and accordingly, the charge delivered to the capacitor 164 is derived essentially from the half-cycles of its power supply, during which the diodes 166 and 168 are conductive.

At such time as the controlled rectifier 160 is gated to a conductive state, the capacitor 164 is placed across a series circuit comprising the controlled rectifier 22 and the inductor 172. The capacitor 164, when fully charged, carries a voltage in opposition to and preferably as great as the maximum voltage available from the power supply 10. Accordingly, the power supply to the transformer 162 is preselected to charge the capacitor 164 to a voltage at least equal to the maximum available from the power supply 10.

When the controlled rectifier 160 is switched to a conductive state, the cathode of the controlled rectifier 22 is immediately presented with a voltage opposite to and at least as great as the voltage from the power supply 10. At the same time, the voltage of the capacitor 164 is added to the voltage of the power supply 10 in a series circuit which includes the energy absorbing means 18, inductor 172, controlled rectifier 160, the controlled rectifier or crowbar 140 and the current sensor 16. With respect to this series circuit it is important that the inductors in the circuit, especially the inductors 17 and 19, be designed with sufficient inductive capability that discharge of the capacitor 164 is delayed a period of time sufficient to hold the reverse voltage on the controlled rectifier 22 beyond the turnoff time for that rectifier. This opposite voltage switches the rectifier 22 to a nonconductive state, and in so doing draws off what are believed to be static charges present in the rectifier 22. Such static charges are accumulated and also opposed by the inductor 172, thus protecting the rectifier 160 from a damaging current rise. In view of these functions, the inductor 172 may be referred to as an energy accumulator or absorber means.

As previously mentioned, the power supply 50 for gating the controlled rectifier 22 continuously supplies a holding current to the controlled rectifier 22 through the resistor 62 and diode 60. However, the power supply 50 is much lower in voltage than the power supply 10, and the capacitor 164, when discharging, presents such a high positive voltage at the cathode of the controlled rectifier 22 that the holding current from the power supply 50 is momentarily interrupted.

Diode 64 protects the power supply 50 from this positive surge by shunting the positive voltage through resistor 62 to the anode of rectifier 22. The result of the discharge of capacitor 164 is that the controlled rectifier 22 is switched to a nonconductive condition and the power supply 10 is thereby disconnected from the crowbar supplied by the controlled rectifier 140.

As previously mentioned, the operation of this disconnect circuitry governed by the controlled rectifier 160 has a built-in delay. This built-in delay is for the purpose of assuring that the crowbar is thrown to protect the load before the capacitor 164 can discharge. If the capacitor 164 should be permitted to discharge before the crowbar has been thrown, the voltage of the capacitor 164 would be added to the voltage of the power supply 10, thereby substantially increasing rather than decreasing the voltage to which the load 12 is exposed.

The time delay which prevents this occurrence results from the time required to charge the capacitor 146 to a level effective to switch the negative resistance device 152 to a conductive state. This time delay is rendered adjustable by a variable tap 147 which can bypass a portion of the resistor 148 in the charging circuit for the capacitor 146. The adjustment allows a compromise to be established between the limited ability of the inductors 17 and 19 to accumulate charge and thereby stall a massive discharge of power from the power supply 10 through the crowbar and the need to assure that the crowbar has operated before the capacitor 164 is permitted to discharge. Thus, the tap to resistor 148 is adjusted to a position at which the time delay exceeds that required to switch the controlled rectifier 140 to a conductive state, but at the same time is less than will permit a discharge of the power supply 10 insufficient to exhaust the charge accumulating ability of inductors 17 and 19.

After operation of the disconnect circuitry which switches the controlled rectifier 22 to a nonconducting state, several events occur. Since the series circuit including the inductors 17 and 19, diode 20, controlled rectifier 22, rectifier 140 and current sensor 16 has been blocked by controlled rectifier 22, current flow in this circuit ceases and accordingly the output from the amplifier 66 which had triggered the crowbar disappears. As a consequence, transistor 80 switches back to its normal conductive state, thereby removing the negative bias on the transistors 113 and 126. In further consequence, the capability of the gate operators for the controlled rectifiers 140 and 160 to provide further gate signals to their respective controlled rectifiers is terminated until such time as the amplifier 66 and its associated detector circuitry can produce another positive pulse. Immediately upon disconnect, of course, the transformer secondaries 136 and 156 discharge through their respective diodes 180 and 182.

With switching of the rectifier 22 to a nonconducting state, the disconnect capacitor 164 is exposed to the positive voltage of the power supply 10. This positive voltage had previously been shunted around capacitor 164 by rectifier 22. Of course, to perform its disconnect function, the power supplied from transformer 162 charged the capacitor 164 to a polarity opposite to that of the power supply 10. Upon disconnect, however, the power supply 10 immediately recharges the capacitor 164 to the polarity of the power supply 10. This interrupts all forward current through the controlled rectifiers 140 and 160, thereby removing the crowbar and also the disconnect circuit discharge path for the capacitor 164. Following this recharging, the capacitor 164 is discharged by its own power supply, then recharged to a polarity opposing the power supply 10. The discharge and subsequent recharge occurs in approximately 500 milliseconds.

The controlled rectifier 22 remains in a state where it cannot again be gated to conductivity so long as the switch 42 remains closed. Thus, as long as the switch 42 remains closed, a sufficient percentage of the voltage available from the power supply 50 is dropped across the resistor 54 that the voltage across the capacitor 52 never rises to a level sufficient to gate the controlled rectifier 22. This means, in effect, that until the switch 42 has been opened and again closed, controlled rectifier 22 cannot be gated and the power supply 10 cannot again be connected to the load 12 or any other load substituted therefor. It is thus convenient to refer to the switch 42 as a disabling means.

Since the power supply 10 has been effectively open-circuited by the controlled rectifier 22, the inductors 17 and 19, which accumulated charge from the power supply 10 immediately after the crowbar had been thrown, commence a discharge through the diodes 184 and 186, the accumulated power being dissipated or absorbed as heat primarily in the inductors 17 and 19. However, it takes a brief moment for the diodes 184 and 186 to switch from their normal condition opposing current flow from the power supply 10 to their forward conducting condition. To forestall development of a very large voltage surge as the diodes 184 and 186 switch to their forward conducting condition, resistors 142 and 144 are placed in series across the diodes 184 and 186. The midpoint between the resistors 142 and 144 connects through conductor 188 to a point midway between the diodes 184 and 186 so as to divide the initial voltage surge produced by the inductors 17 and 19 between the diodes 184 and 186. This assures that both diodes are equally biased to their forward conducting condition and, more importantly, assures that neither of the diodes receives an unequal and possibly destructive voltage surge. After the diodes 184 and 186 have switched to their forward conducting condition, the resistors 142 and 144 are isolated from the discharge path for the inductors 17 and 19, due to the forward conductivity of the diodes 184 and 186. It will be understood that the resistors 142 and 144 are large in comparison to the resistance of the inductors 17 and 19. Accordingly, the presence of the resistors 142 and 144 in the load test circuit can be ignored since the voltage drop therethrough will be negligible.

It will be noted by those skilled in the art that the circuits as thus far described provide no means to remove voltage from the load after a successful test. Thus, with the controlled rectifier having been gated to a conductive condition by closure of the manual switch 26 and ensuing closure of the disabling switch 42, a subsequent opening of the switch 26, in the absence of additional circuitry, cannot be expected to remove the voltage of the power supply 10 from the load 12. To allow for removal of a load which did not fire the crowbar, relay switches 44 and 46 responsive to relay coil 28 and a relay switch 48 responsive to relay coil 38 are provided. Relay switches 44 and 46 are ganged together in make-before-break fashion so that upon initial energization of relay coil 28 the switch 46 closed before the switch 44 opened. At this time, relay coil 38 was just being energized through switch 32 and, accordingly, switch 48 is open during the briefly simultaneous closure of switches 44 and 46. Switch 48 thus inhibits an undesired signal to the control point 78 when the manual switch 26 is closed.

When the manual switch 26 is opened, however, so as to collapse the field about the relay coil 28, switch 44 makes before switch 46 breaks. It also makes before the inhibitor switch 48 breaks since switch 48 cannot break until after switch 32 responsive to relay coil 28 has opened to collapse the field of relay coil 38. As is conventional, the relay coils 28 and 38 are provided discharge paths through the diodes 40 and 41, respectively.

As a result, upon opening of the manual switch 26, a momentary circuit to ground appears through the switches 44, 46 and 48. This momentary ground signal represents a turnoff signal which acts upon the inverter circuit portion of the detector circuit to present a simulated overcurrent signal at the collector for the transistor 80. Thus, the turnoff signal acts through the diode 47 to divert the negative voltage at terminal 84 to ground through the resistor 90. This momentary diversion causes a positive bias to appear on the base of transistor 80, causing an overcurrent signal which fires the crowbar. With proper relay selection this momentary pulse can also last long enough to fire the disconnect circuitry. In any event, however, as soon as the crowbar fires, current through the series circuit thereby completed across the power supply 10 triggers the amplifier 66 and its associated detector circuit to hold the transistor 80 nonconductive for a period of time sufficient to outlive the delay period in the disconnect gate circuit. The voltage from the power supply 10 is thus disconnected from the load circuitry by the crowbar at 140 in the same fashion as if a defective transistor had been tested. The same mechanism is thus used to remove voltage from the load whether the load tested was within or without its specifications.

It will further occur to those skilled in the art that the circuits as thus far described provide no visual means to advise an operator whether or not the load being tested was found by the test circuitry to be within or without its specifications. This function is conveniently derived from the terminal 190 which is common to the control point 78. Throughout a successful test, the potential at 190 remains negative due to the influence of the negative voltage at the terminal 84. If the load being tested is outside specifications, however, so as to fire the crowbar, the potential at terminal 190 will shift positive so as to enable any suitable detector mechanism connected to the terminal 190 to signify that the crowbar has fired and therefore a defective load was on test.

Assuming the load to have been within specifications so that the crowbar did not fire, the operator will know that the load was within specifications by an absence of a signal from the detector circuit and will therefore know that the switch 26 must be opened to remove voltage from the load. As soon as switch 26 is opened, circuit ground will appear at the terminal 190 due to the operation of the relay switches 44, 46 and 48 and promptly thereafter the terminal 190 will become positive due to an operation F the crowbar at 140. These voltage conditions can, when desired, be sensed at the terminal 190 by a recording mechanism which can be used to advise the operator that voltage has been removed from the load and also can keep a record of the circuit operation during each load test.

It will be noted that when the manual switch 26 is opened, the relay coil 28 is deenergized and this permits the disabling switch 42 to open, thereby allowing a charge adequate to gate the controlled rectifier 22 to develop in the capacitor 52. Upon subsequent closure of the manual switch 26 and consequent energization of relay coil 28, the disabling switch 42 closes so as to be enabled to pass a gate signal to the controlled rectifier 22. The relay coil 28 and its energy source may therefore be characterized as an enabling means for the normally open disabling switch 42.

I claim:

1. A voltage cutoff circuit comprising: first and second terminals for connection to a source of voltage, third and fourth terminals for connection to a load, first circuit means connected to said first and third terminals for providing a current path therebetween, second circuit means connected to said second and fourth terminals for providing a current path therebetween, one of said first and second circuit means including a current sensor, detector means responsive to said current sensor to produce an overcurrent signal, a first switchable device connected directly and without appreciable resistance in series therewith between said first and second circuit means, a second switchable device having a conductive state and being switchable to a nonconductive state, first energy absorbing means, the portions of said first and second circuit means disposed between said first switchable device and said first and second terminals respectively cooperating with said first switchable device to provide a series circuit across said first and second terminals, said series circuit including said second switchable device, said first energy absorbing means and said current sensor, said first switchable device having a nonconductive state and being switchable to a conductive state, first operator means responsive to said overcurrent signal to switch said first switchable device to its conductive state, and second operator means responsive to said overcurrent signal to switch said second switchable device to its nonconductive state.

2. The cutoff circuit of claim 1 wherein said current sensor is a resistance element.

3. The cutoff circuit of claim 1 wherein said second switchable device is a controlled rectifier having a forward current direction, said second operator means including capacitance means and third circuit means to connect said capacitance means across said controlled rectifier, said third circuit means including a third switchable device, said second operator means including power supply means charging said capacitance means in opposition to the forward current direction of said controlled rectifier, said second operator means including means responsive to said overcurrent signal to switch said third switchable device to a conductive condition.

4. The cutoff circuit of claim 3 wherein said first and second operator means are simultaneously responsive to said overcurrent signal, said second operator means including time delay means causing switching of said third switchable device at a time which follows switching of said first switchable device by said first operator means.

5. The cutoff circuit of claim 4 wherein said third circuit means includes second energy absorbing means.

6. The cutoff circuit of claim 5 in which said second energy absorbing means comprises an inductance element.

7. The cutoff circuit of claim 4 wherein said first energy absorbing means includes an energy accumulator having a limited ability to accumulate energy, said second operator means including means to adjust said time delay means to cause switching of said third switchable device to its conductive state prior to the time the ability of said energy accumulator means to accumulate energy has been exhausted.

8. The cutoff circuit of claim 7 wherein said first energy absorbing means comprises an inductance element.

9. A voltage cutoff circuit comprising, in combination: first and second terminals for connection to a source of voltage, third and fourth terminals for connection to a load, first circuit means connected to said first and third terminals for providing a current path therebetween, second circuit means connected to said second and fourth terminals for providing a current path therebetween, one of said first and second circuit means including a controlled rectifier having a gate, power supply means to energize said gate to switch said controlled rectifier, disabling means to block energization of said gate interposed between said power supply means and said gate, a manual switch, and means responsive to closure of said manual switch to enable said disabling means.

10. The cutoff circuit of claim 9 wherein one of said first and second circuit means includes a current sensor, detector means responsive to said current sensor to produce an overcurrent signal, a first switchable device connected between said first and second circuit means, the portions of said circuit means disposed between said first switchable device and said first and second terminals respectively cooperating with said first switchable device to provide a series circuit across said first and second terminals, said first switchable device having a nonconductive state and being switchable to a conductive state, first operator means responsive to said overcurrent signal to switch said first switchable device to its conductive state, means responsive to opening of said manual switch to produce a turnoff signal, said detector means including a signal inverter, said signal inverter responsive to said turnoff signal to simulate an overcurrent signal, said first operator means responsive to said simulated overcurrent signal to switch said first switchable device to its conductive state.

11. The cutoff circuit of claim 10 including means to inhibit said turnoff signal as said manual switch is closed.

12. A voltage cutoff circuit comprising: first and second terminals for connection to a source of voltage, third and fourth terminals for connection to a load, first circuit means connected to said first and third terminals for providing a current path therebetween, second circuit means connected to said second and fourth terminals for providing a current path therebetween, one of said first and second circuit means including a current sensor, detector means responsive to said current sensor to produce an overcurrent signal, a first switchable device connected between said first and second circuit means, a second switchable device having a conductive state and being switchable to a nonconductive state, the portions of said first and second circuit means disposed between said first switchable device and said first and second terminals respectively cooperating with said first switchable device to provide a series circuit across said first and second terminals, said series circuit including said second switchable device and first energy absorbing means, said first switchable device having a nonconductive state and being switchable to a conductive state, first operator means responsive to said overcurrent signal to switch said first switchable device to its conductive state, and second operator means responsive to said overcurrent signal to switch said second switchable device to its nonconductive state.

13. The cutoff circuit of claim 12 wherein said current sensor is disposed in said series circuit.

14. The cutoff circuit of claim 13 wherein said current sensor is a resistance element.